United States Patent
Burgio et al.

(10) Patent No.: US 11,637,683 B2
(45) Date of Patent: Apr. 25, 2023

(54) CLOCK RECOVERY METHOD, CORRESPONDING CIRCUIT AND SYSTEM

(71) Applicant: STMicroelectronics S.r.l., Agrate Brianza (IT)

(72) Inventors: Carmelo Burgio, Bergamo (IT); Walter Girardi, Appiano Centile (IT); Sergio Lecce, Pavia (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 17/335,336

(22) Filed: Jun. 1, 2021

(65) Prior Publication Data
US 2021/0385059 A1 Dec. 9, 2021

(30) Foreign Application Priority Data
Jun. 4, 2020 (IT) .................. 102020000013222

(51) Int. Cl.
*H04L 1/00* (2006.01)
*H04L 7/04* (2006.01)
*H04L 7/00* (2006.01)

(52) U.S. Cl.
CPC .......... *H04L 7/0016* (2013.01); *H04L 1/0061* (2013.01); *H04L 7/0087* (2013.01); *H04L 7/048* (2013.01)

(58) Field of Classification Search
CPC ..... H04L 7/0016; H04L 7/048; H04L 1/0061; H04L 7/0331; H04L 7/0079; H04L 7/0087
See application file for complete search history.

(56) References Cited

U.S. PATENT DOCUMENTS

| | | | |
|---|---|---|---|
| 6,389,548 B1 | 5/2002 | Bowles | |
| 6,625,125 B1* | 9/2003 | Hagiwara | H04B 17/318 370/347 |
| 7,940,874 B2* | 5/2011 | Fuhrmann | H04L 7/0337 713/400 |
| 9,509,491 B2* | 11/2016 | Hayakawa | H04L 7/0087 |
| 2017/0109309 A1* | 4/2017 | van de Burgt | H04L 12/4013 |
| 2020/0076643 A1 | 3/2020 | Wojciechowski | |

FOREIGN PATENT DOCUMENTS

WO 2014191788 A1 12/2014

OTHER PUBLICATIONS

IT Search Report and Written Opinion for IT Appl. No. 102020000013222 dated Feb. 26, 2021 (9 pages).

* cited by examiner

*Primary Examiner* — Betsy Deppe
(74) *Attorney, Agent, or Firm* — Crowe & Dunlevy LLC (57) ABSTRACT

An input signal arranged in frames is received. The frames include a cyclic redundancy check (CRC) field including a number of bits having bit edges. A timing signal is generated to include adjustable duration waveforms at one of a first duration value and a second duration value. A CRC check determines the occurrence, over the duration, of a number of waveforms of the timing signal having their duration adjusted to one of the first duration value and the second duration value which corresponds to the number of bits. A check signal is produced having a pass/fail value. If pass, the duration of the waveforms in the timing signal is maintained adjusted to the one of the first duration value and the second duration value. If fail, the duration of the waveforms in the timing signal is re-adjusted to the other of the first duration value and the second duration value.

22 Claims, 4 Drawing Sheets

CLOCK RECOVERY METHOD, CORRESPONDING CIRCUIT AND SYSTEM

PRIORITY CLAIM

This application claims the priority benefit of Italian Application for Patent No. 102020000013222, filed on Jun. 4, 2020, the content of which is hereby incorporated by reference in its entirety to the maximum extent allowable by law.

TECHNICAL FIELD

The description relates to clock recovery.

One or more embodiments can be used, for instance, in the automotive field.

One or more embodiments can be used in applications involving partial networking. Door zone or engine management in the automotive field may be exemplary of such applications.

BACKGROUND

Effective clock recovery is a desirable feature in applications such as controller area network (CAN) partial networking, primarily in those applications using an oscillator having low accuracy (a period error in excess of 5%, up to +/−10%, for instance) possibly without error compensation in temperature.

Conventional clock and data recovery circuits may be based on frequency locking with the oscillation frequency of an internal oscillator locked to the bitrate of an incoming signal.

Such an approach may lead to adequately recovering period errors in the +/−5% range. Recovery of larger errors (for instance +/−10% over a wide temperature range) may involve feed-forward error compensation aimed at recovering oscillator period deviation versus temperature.

For instance, oscillator period deviation can be interpolated versus actual junction temperature of oscillator semiconductor circuitry based on error values measured during automated testing (automated test equipment (ATE) testing) and stored in a one-time programmable (OTP) memory. The input signal can thus be correctly locked provided the maximum difference between the linear interpolation and the real period error of the oscillator is less than 5%, for instance.

There is accordingly a need in the art to contribute in improving clock recovery performance in contexts as discussed in the foregoing, for instance.

SUMMARY

One or more embodiments may relate to a method.

One or more embodiments may relate to a corresponding circuit. A clock data recovery circuit for use in a (partial) networking system may be exemplary of such a circuit.

One or more embodiments may relate to a corresponding system. A Controller Area Network (CAN) for use in the automotive sector may be exemplary of such a system.

One or more embodiments may facilitate clock frequency recovery from an input bitstream.

One or more embodiments may involve decoding a synchronization frame and measuring the time between two consecutive falling edges therein, with a timer slope corrected taking into account an integer value of a number of bits such as a floor value. A subsequent (successive) synchronization frame can be decoded and a redundancy check (such as a Cyclic Redundancy Check (CRC)) performed. If the outcome of the redundancy check is positive, the integer value selected in the previous step is validated; otherwise the integer value is changed to another integer value such as, for instance, a ceiling value if the previous value was taken as a floor value.

One or more embodiments may facilitate adequately correcting an oscillator period error up to +/−10% without resorting to feed-forward compensation.

BRIEF DESCRIPTION OF THE DRAWINGS

One or more embodiments will now be described, by way of example only, with reference to the annexed figures, wherein.

DETAILED DESCRIPTION

In the following description, various specific details are given to provide a thorough understanding of various exemplary embodiments of the present specification. The embodiments may be practiced without one or several specific details, or with other methods, components, materials, etc. In other instances, well-known structures, materials, or operations are not shown or described in detail in order to avoid obscuring various aspects of the embodiments. Reference throughout this specification to "one embodiment" or "an embodiment" means that a particular feature, structure, or characteristic described in connection with the embodiment is included in at least one embodiment. Thus, the possible appearances of the phrases "in one embodiment" or "in an embodiment" in various places throughout this specification are not necessarily all referring to the same embodiment. Furthermore, particular features, structures, or characteristics may be combined in any suitable manner in one or more embodiments.

The headings/references provided herein are for convenience only, and therefore do not interpret the extent of protection or scope of the embodiments.

Figure 1:
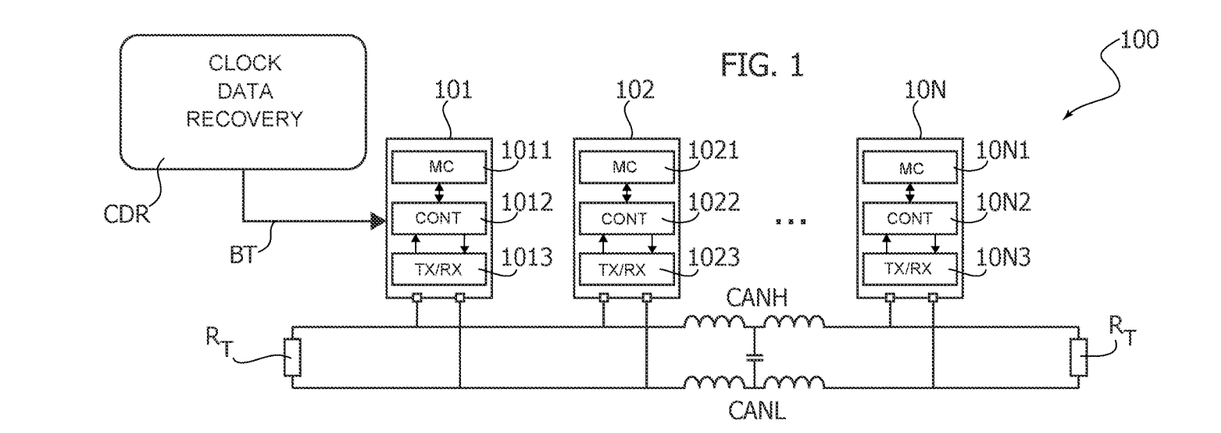
FIG. 1 is a block diagram exemplary of a possible context of use of embodiments.

In FIG. 1, reference 100 denotes as a whole a network such as a Controller Area Network (CAN), that is a network including a bus (CAN bus) including "high" and "low" lines CANH and CANL terminated onto end resistors $R_T$ and having a plurality (e.g., N) of electronic control units (ECUs) 101, 102, . . . , 10N coupled to the bus lines CANH, CANL.

The individual ECUs 101, 102, . . . , 10N may (each) comprise: a microcontroller (MC) 1011, 1021, . . . , 10N1; a CAN controller (Cont) 1012, 1022, . . . , 10N2; and a transceiver (Tx/Rx) 1013, 1023, . . . , 10N3.

A CAN 100 as exemplified in FIG. 1 provides a bus standard suited for use, for instance, in a vehicle context.

Due to the differential nature of the bus lines CANH, CANL, a CAN 100 as exemplified herein exhibits a marked robustness against noise.

As a result of a message-based protocol being used, a CAN 100 as exemplified herein also facilitates communication between microcontrollers and devices controlled thereby (not visible in FIG. 1) without a host computer.

For instance, for each device the data in a frame can be transmitted in sequence by adopting a priority mechanism such that if plural devices transmit at the same time, a device having a higher/highest priority continues the transmission while the other, conflicting devices discontinue transmission. Frames as transmitted are received by all the devices coupled to the bus, including the transmitting device.

Figure 2:
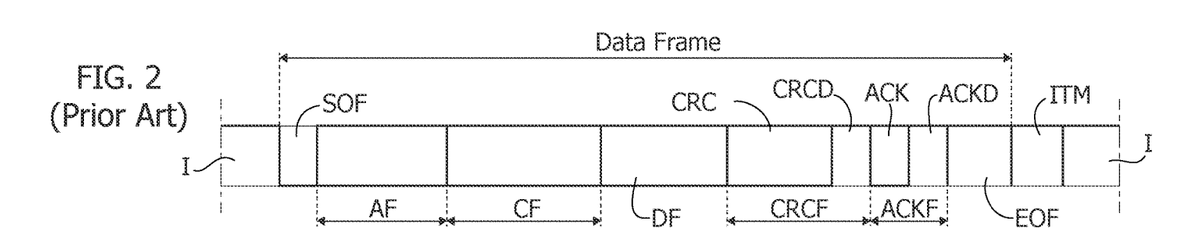
FIG. 2 illustrates a Controller Area Network (CAN) frame.

FIG. 2 illustrates a conventional CAN frame, shown between two "bus idle" states designated I.

A frame as illustrated in FIG. 2 comprises the following fields:
Start Of Frame—SOF;
Arbitration Field—AF;
Control Field—CF;
Data Field—DF;
CRC Field—CRCF, in turn comprising a CRC (Cyclical Redundancy Check) sequence and a CRC delimiter CRCD;
ACK Field—ACKF, in turn comprising an acknowledgement slot bit ACK and an ACK delimiter ACKD;
End Of Frame—EOF; and
Intermission Field—ITM.

The CRC sequence in each frame consists of 15 bits.

The value of these bits depends on all the previous bits (excluding possible stuffing bits) in the frame and is calculated by means of a polynomial, which for conventional frames (as illustrated here) is defined as: $CRC\_15 = C599_{16} = (x15+x14+x10+x8+x7+x4+x3+1)$.

Each receiver in a CAN 100 as exemplified in FIG. 1 includes a decoder configured to calculate the CRC from the data received. If these are different from the data sent, the CRC calculated "internally" by the decoder will be different from the CRC received, and the frame is discarded.

Stated otherwise, such a CRC check involves a comparison of the CRC in the frame received and the CRC calculated in the receiver: if these CRC's are identical, the check is passed; otherwise it fails.

The general concepts underlying the structure and operation of a CAN network 100 as exemplified in FIGS. 1 and 2 are well known to those of skill in the art, which makes it unnecessary to provide a more detailed description herein.

A (partial) networking arrangement as exemplified in FIG. 1 may involve decoding the input bitstream received by each device (ECU) coupled to the bus, with such a bitstream expected to be asynchronous with respect to the internal oscillator of the device.

Consequently, a clock data recovery circuit CDR can be provided at each device (ECU) 101, 102, . . . , 10N with the aim of synchronizing the internal oscillator to the input bitstream received by the device. For simplicity, only one such clock data recovery circuit CDR is visible in FIG. 1 under the general assumption that similar circuits are provided for the other devices in the network 100.

As known to those of skill in the art, operation of a CAN network 100 as exemplified in FIG. 1 may involve so-called recessive-to-dominant (REC-DOM) as well as dominant-to-recessive (DOM-REC) transitions.

As noted, a CAN bus uses differential wired-AND signals so that the lines CANH and CANL in the bus can be driven to a "dominant" state (during which CANH is at a higher voltage than CANL) or not driven and pulled by passive resistors such as $R_T$ to a "recessive" state (during which CANH is at a voltage lower or equal to the voltage at CANL).

For instance, for transmission purposes: a logic "0" data bit can be encoded as a dominant state (DOM), and a logic "1" data bit can be encoded as a recessive state (REC).

That solution (per se non-imperative) co-operates with the wired-AND connection in giving to devices having lower ID numbers priority for access to the bus as discussed previously.

In such a context, synchronization can be advantageously performed on falling edges by taking into account that REC-DOM transitions are low-impedance driven and tend to be sharp, and thus better suited for synchronization purposes in comparison with DOM-REC transitions.

For instance, synchronization may be based on measuring the number of bits between two subsequent (consecutive) falling edges, that is first and second homologous edges (both falling edges, for instance) having no homologous (again falling, for instance) third edge therebetween.

In that respect it will be appreciated that while reference to a CAN bus is made throughout this detailed description for simplicity and ease of understanding, the same type of operation and the underlying considerations may be applied also to other bus types operating on similar principles.

Stated otherwise, reference to a CAN bus and, more to the point, reference to a CAN network is merely for exemplary purposes and is not to be construed, even indirectly, in a limiting sense of embodiments.

In certain contexts of operation, bit-stuffing may be adopted, that is, allowing a maximum number of consecutive coincident bits, such as 5 (five). Consequently, two subsequent consecutive synchronization edges within a same frame may come, at a maximum distance of, for instance, 2×5=10 bit periods.

Figure 3:
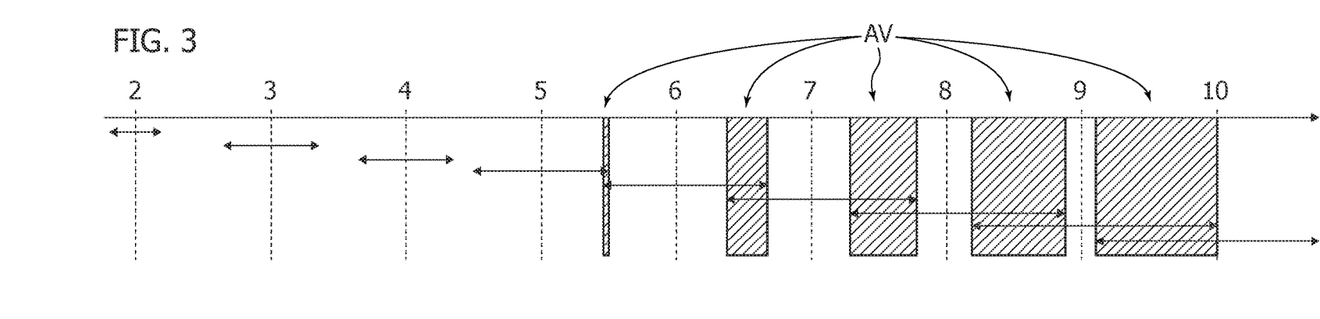
FIG. 3 is exemplary of the possible effect of clock inaccuracy of an oscillator in a context as exemplified in FIG. 1.

FIG. 3 is exemplary of the possible effect of oscillator period error in a sequence of bits. Taking into account that the minimum distance between two falling edges is 2 bits, an oscillator period error (+/−10%, for instance) may gradually lead to increasingly ambiguous values AV for those bits gradually coming near to the maximum distance discussed in the foregoing, namely 2×5=10 bit periods, for instance.

Figure 4:
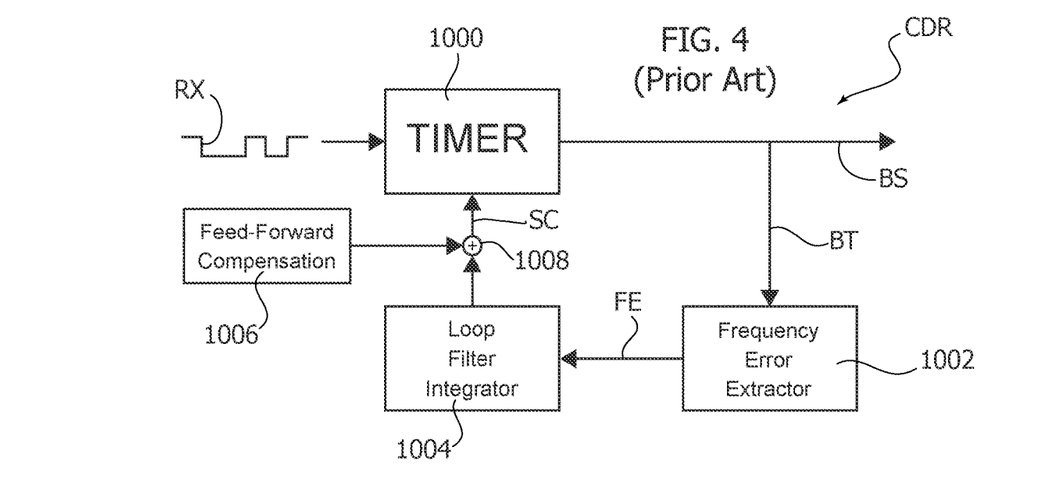
FIG. 4 is a block diagram exemplary of a conventional approach in clock recovery.

FIG. 4 is a block diagram exemplary of a clock data recovery circuit CDR comprising a frequency locking system configured to lock the frequency of an oscillator internal to a certain device (any of the ECUs 101, 102, . . . , 10N of FIG. 1 being possibly exemplary of such a device) to the bitrate (frequency) of an incoming received signal RX.

In the block diagram of FIG. 4, reference 1000 denotes a timer circuit configured to generate a sawtooth signal BT (bit time) having a slope intended to be tuned.

Figure 5A:
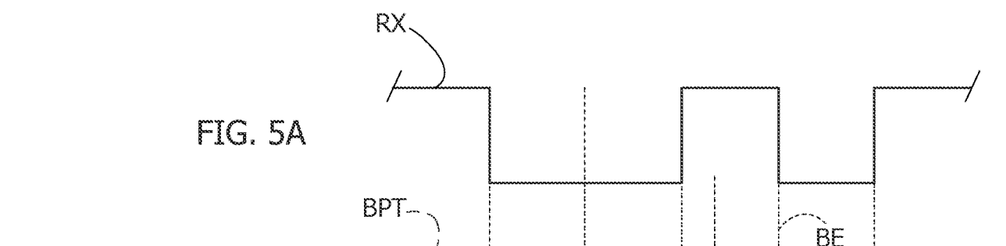
FIGS. 5A and 5B are time diagrams exemplary of possible operation of a circuit based on the concept outlined in FIG. 4.
Figure 5B:
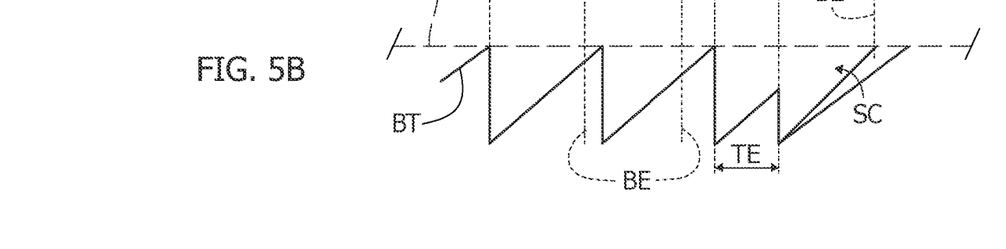

As exemplified in FIGS. 5A and 5B, such tuning action may have the target of causing the "tips" of the sawtooth signal (that is the points where the signal BT reaches a period threshold BPT) to coincide with the actual bit falling edges BE, so that the signal BT may be adjusted to have a period equal to the bit time of the input signal RX. In that way the signal BT can used to generate a strobe signal BS useful in sampling the input bitstream (see also signal BS as illustrated in FIG. 9B).

As exemplified in FIG. 4, the output from the timer 1000 (bit time signal BT) is fed to a frequency error extraction circuit 1002. The circuit 1002 is configured to extract a current oscillator frequency error by comparing the actual oscillator period with the bit edges BE of the incoming signal RX thus generating a frequency error signal FE.

As exemplified in FIG. 4, the frequency error signal FE is fed to a loop filter integrator circuit 1004 configured to integrate the bit period error over multiple transitions (see the time error TE in FIG. 5B) and produce a signal SC which is supplied to the timer 1000 for adjusting the slope of the sawtooth signal generated by the timer circuit 1000 so that, as a result of the slope adjustment (as exemplified by SC in FIG. 5B), the signal BT reaches a desired bit period threshold BPT at the time of a bit edge BE.

As exemplified in FIG. 4, adjustment of the slope of the sawtooth signal generated by the timer circuit 1000 via the adjustment signal exemplified by SC takes into account a compensation signal from a feed-forward compensation circuit 1006 which is injected at a node 1008 in the signal propagation path from the loop filter integration circuit 1004 to the timer circuit 1000.

As noted, possible operation of a (conventional) arrangement as exemplified in FIG. 4 is illustrated in the time diagrams of FIGS. 5A, 5B which represent, against a common time (abscissa) scale t: the input signal RX having bit edges BE (FIG. 5A); and the bit-time signal BT, the (accumulated) timing error deriving from the frequency error FE in FIG. 4 and the slope correction action via the signal SC towards the threshold BPT (FIG. 5A).

As noted, operation of a clock data recovery circuit CDR as exemplified in FIG. 4 may take advantage of the sharper REC-DOM transitions (if applied to a CAN bus) and involve: integrating the error over multiple transitions assuming a certain maximum number of bits between two subsequent falling edges (for instance 2×5=10, resulting from bit-stuffing); and adjusting the slope of signal from the timer circuit 1000 correspondingly.

Feed-forward compensation as exemplified by circuits 1006 and 1008 in FIG. 4 facilitates recovery of oscillator period deviation versus temperature.

As discussed, compensation may involve interpolating deviations of the oscillator period based on plural (three, for instance) error values obtained during an (automated) testing action and stored in a memory (OTP, for instance) which may be regarded as included in the feed-forward compensation circuit 1006 in FIG. 4.

Correct locking of the input signal RX may thus be achieved in a solution as exemplified in FIG. 4 provided the difference between the linear interpolation and the actual period error of the oscillator lies within a certain limit (+/−5% for instance).

Irrespective of this, a solution as exemplified in FIG. 4 suffers from drawbacks related to the test time (automated trimming procedures) and the semiconductor area occupied by the digital logic and the OTP registers which may be included in the feed-forward compensation circuit 1006.

Figures 6, 7:
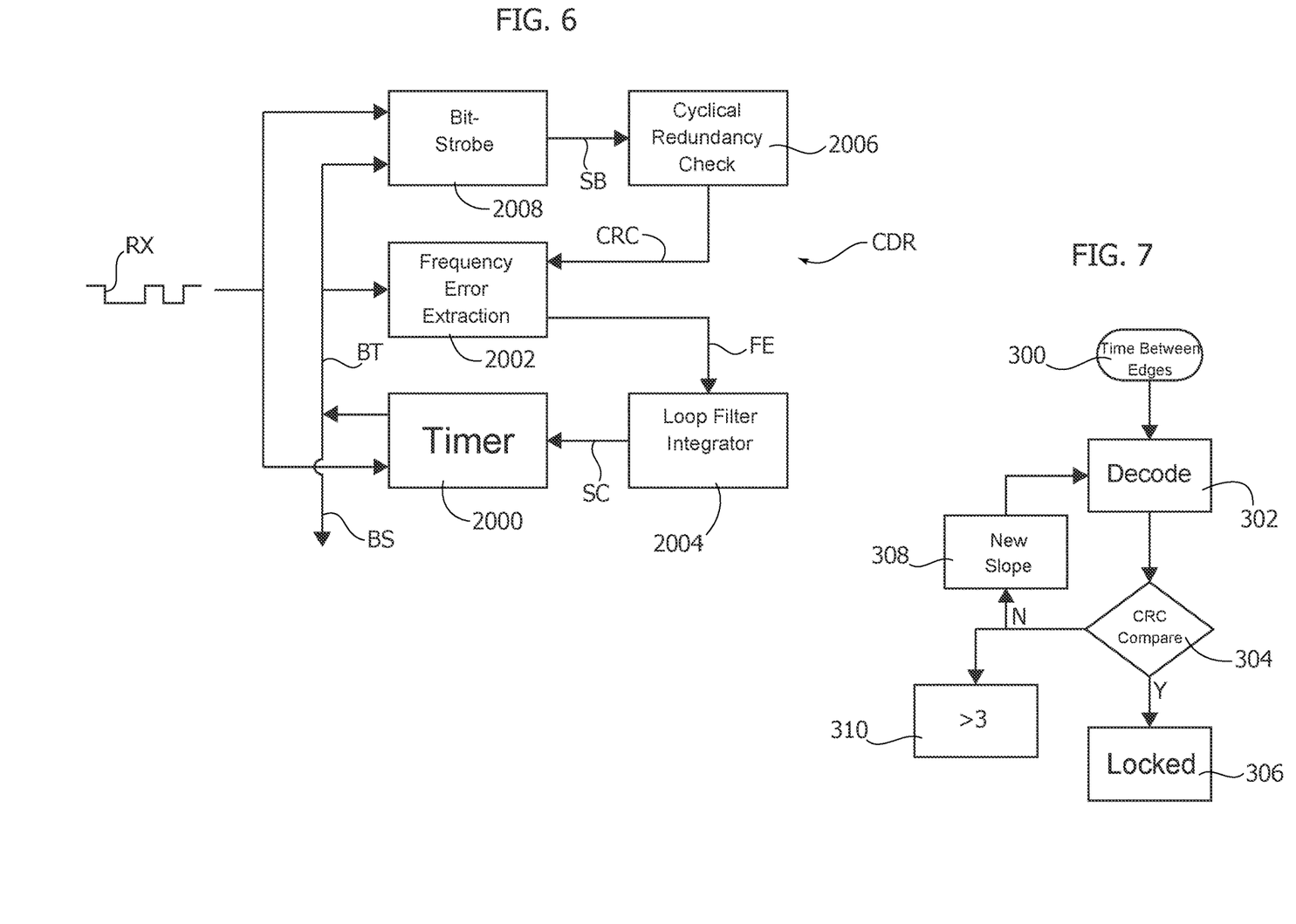
FIG. 6 is a block diagram exemplary of embodiments.
FIG. 7 is a flow chart exemplary of possible operation of a circuit as per the block diagram of FIG. 6.

These issues are addressed by embodiments as exemplified in FIG. 6.

In the block diagram of FIG. 6, a timer circuit 2000 is shown configured to receive the input signal RX and send a bit time signal BT towards a frequency error extraction circuit 2002. This is in turn configured for generating a frequency error signal FE to be supplied to a loop filter integrator 2004, which produces a slope correction signal SC which is supplied to the timer circuit 2000.

The same designations and/or reference symbols are used in FIG. 4 and FIG. 6 for the timer circuit, the frequency error extraction circuit and the loop filter integrator as well as for the bit-time signal, the frequency error signal and the slope correction signal.

Such a choice is intended to facilitate comparison for ease of explanation and understanding. It will be otherwise appreciated that circuits/signals having like designations in FIGS. 4 and 6 are not necessarily implemented in the same way and/or do not necessarily have identical time behaviors.

In embodiments as exemplified in FIG. 6 (and as further discussed in the following), the frequency error extraction circuit 2002 generates frequency error signals FE on the basis of: the signal BT from the timer circuit 2000; and a signal CRC indicating the outcome of a redundancy check (such as a Cyclic Redundancy Check, briefly CRC) from a frame decoder circuit 2006 which in turn receives a sampled bit-signal SB from a bit-strobe circuit 2008 sensitive to both the input signal RX and the signal BT from the timer circuit 2000.

In one or more embodiments as exemplified in FIG. 6, (where again the sawtooth signal BT from the timer circuit 2000 can be used to produce a strobe signal BS useful in sampling the input bitstream—see also BS as illustrated in FIG. 9B) bit-time ambiguity as due to an error in the clock generation action can be resolved by "trying" two possible values in two subsequent/consecutive frames, with a redundancy check such as a Cyclic Redundancy Check (CRC) used to validate the result of selection (selected choice).

By way of general explanation, in one or more embodiments such ambiguity may be resolved along the lines of the flowchart of FIG. 7.

An action as exemplified at 300 involves using a first (synchronization or synch) frame in the signal RX to measure the time between two subsequent homologous edges, that is two edges of the same type (falling edges, for instance) coming one after the other with no edges of the same type occurring therebetween: for instance, two falling edges coming one after the other with a rising edge therebetween represent two subsequent homologous edges as intended herein.

As exemplified in FIG. 7, the action as exemplified at 300 is performed while the slope of the sawtooth signal generated by the timer 2000 is adjusted to a first value, which may be assumed to correspond to a first "floor" (lower) value.

An action as exemplified at 302 involves a corresponding measurement (decode) performed "internally" (that is at the receivers 101, 102, ... 10N) with a comparison performed at 304 of the result obtained from the received bitstream and the result obtained internally.

For instance, in one or more embodiments, the comparison performed at 304 may involve a comparison of the CRC calculated internally with the CRC field of the received bitstream.

If the check at 304 yields a positive outcome (CRC correct, outcome from 304=Y), the previous slope value as determined on the basis of the time between two consecutive edges measured on the first synch frame is validated and a "locked" flag is asserted at 306 with the validated value used as starting point of the loop filter.

If, conversely, the check at 304 yields a negative outcome (CRC not correct) a different, second slope value is set at 308, for instance a value obtained replacing the first "floor" value with a second "ceiling" (higher) value and system operation returns to 302.

One or more embodiments may contemplate that, if the check at 304 fails repeatedly (for instance three or more times in a row), an error state can be declared as exemplified by 310.

In one or more embodiments as exemplified in FIG. 6, the bit-strobe generator circuit 2008 can be configured to select the sampling point of the bit time at the "raw data" signal RX and the frame decoder circuit 2006 can be configured to implement a wake-up feature and (also) to validate the slope correction by implementing the CRC check of step 304 in FIG. 7, with the CRC signal assuming different logical values corresponding to the outcome of step 304 being either Y or N.

Figure 8:
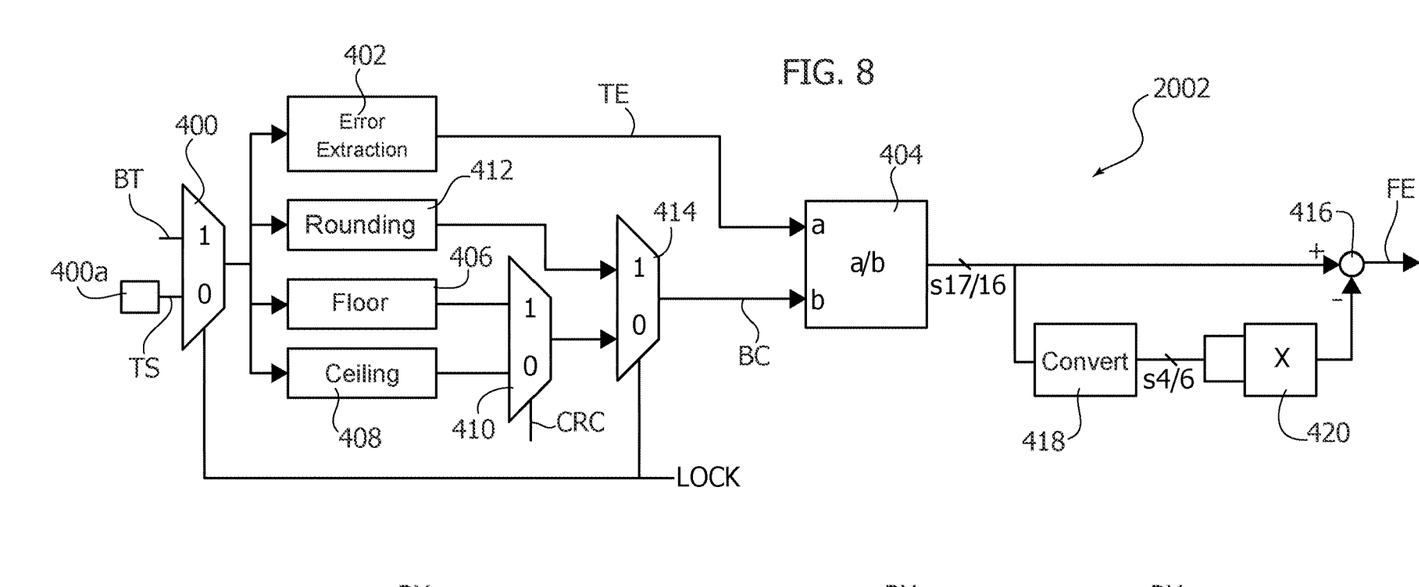
FIG. 8 is a circuit diagram exemplary of a possible implementation of a solution as exemplified in FIG. 6, and FIGS. 9A and 9B are timing diagrams exemplary of a possible time behavior of signals which may be present in embodiments of the present description.

The block diagram of FIG. 8 is exemplary of a possible implementation of the frequency error extraction circuitry 2002 in the exemplary block diagram of FIG. 6, wherein the circuit 2002 is intended to be sensitive to a signal from the timer 2000 (this may simply correspond to the time between two consecutive falling edges) and the CRC signal from the frame decoder 2006 (configured to perform the CRC check of step 304 of FIG. 7).

As exemplified in FIG. 8, the frequency error extraction circuitry 2002 may comprise an input multiplexer 400 receiving the time signal BT from the timer circuit 2000 and a measured time value (from a memory (M) 400a, for instance) which facilitates validation of a correct slope using a same timer value for two subsequent trials as discussed previously.

The output from the multiplexer 400 is supplied to an error extraction circuit 402 which generates a total error signal TE to be supplied to a first input (designated a) of an a/b divider 404.

The output from the multiplexer 400 is also supplied to two circuits 406 and 408 which perform the "floor" and "ceiling" functions as discussed previously, with the respective results sent to a multiplexer 410.

The output from the multiplexer 400 is also supplied to a rounding circuit 412 so that a further multiplexer 414 may receive (to be supplied to a second input, marked b, of the a/b divider 404) a bit count signal BC given by either one of: the output from the multiplexer 410 (that is—in turn—the output from either one of the floor value 406 or the ceiling value 408); and the output signal from the rounding circuit 412.

In simple explanatory terms, in operation of a circuit as exemplified in FIG. 8, once a lock condition is achieved (step 306 in FIG. 7) a LOCK signal applied to the multiplexers 400 and 414 will result in the timer signal from the timer circuit 2000 being forwarded to the input b of the divider 404 via the rounding circuit 412, so that, after the lock phase, a bit count signal BC applied to the input b can be evaluated just by rounding the timer signal.

Conversely, prior to locking achieved, the a/b divider 404 will be supplied via the multiplexer 414 with either one of the floor or ceiling values from the circuits 406, 408 as a function of the value of the signal CRC indicative of the CRC check outcome.

In embodiments as exemplified in FIG. 8, the output from the a/b divider 404 can be a signal including a total number of bits (17, for instance) including a sign bit plus integer bits and fractional bits with a number of fractional bits equal, for instance, to 16.

In embodiments as exemplified herein, the signal from the divider 404 can be supplied to a summation node (with sign) 416 which can be configured to generate the frequency error signal FE by combining (subtracting) from the output signal from the divider 404 an interpolated value obtained by converting at a converter 418 the signal from the divider 404 to a shorter format such as, for instance, a signal in a format s4/6 obtained from the s17/16 signal from the divider 404 with subsequent generation, at a circuit 420 (a multiplier for instance) of a second order term of a Taylor series.

By way of summary, a synchronization procedure as discussed herein has the purpose of reducing (notionally to zero) the time error between the internal oscillators of the units (ECUs) 101, 102, . . . , 10N coupled to the bus lines CANH, CANL and the bitstream transmitted thereon.

If referred to a single bit, such an error can be defined as:

$$TE_B = \frac{TE}{BC}$$

where TE corresponds to the sum of the errors for each bit (see FIG. 5B) and BC is the number of bits between two falling edges ($TE_B$ is the output of the divider 404 in FIG. 8).

An accurate error estimate thus involves correctly determining the value for BC. This is calculated "internally" at each unit 101, 102, . . . , 10N as:

$$BC = \frac{N}{OVS}$$

where N is the number of clock pulses between two consecutive falling edges and OVS is an oversampling factor.

In arrangements as exemplified in FIG. 4 the value for BC is rounded to the nearest integer. This is facilitated by the error on the oscillator period being reduced below +/−5% (for instance) using the feedforward compensation at 1006, so that a univocal value can be calculated for BC.

As discussed, in the presence of a larger error (+/−10%, for instance) BC is no longer univocal, as exemplified in FIG. 3.

Using an erroneous value for BC militates against correct CDR synchronization with the received bitstream (within five frames, as specified by ISO standards) and may result in loop filter divergence.

The dependency of BC on the error in the clock period can be expressed as follows:

$$T_{osc} = T_{osc}^{typ} \times (1 + \varepsilon_{osc})$$

$$NxT = BC^{real} \times T_B$$

$$OVS = \frac{T_B}{T_{osc}^{typ}}$$

$$BC = \frac{N}{OVS} = \frac{BC^{real} \times T_B}{T_{osc} \times OVS} = \frac{BC^{real}}{1 + \varepsilon_{osc}}$$

wherein: $T_{osc}^{typ}$ is the typical value of the period of the oscillator; $T_{osc}$ is the period of the oscillator; $\varepsilon_{cost}$ is the error affecting oscillator period; $T_B$ is the time duration of one bit; N is the number of clock pulses between two subsequent falling edges; $BC^{real}$ is the number of bits actually present between two subsequent falling edges; BC is the number of bits calculated digitally; and OVS is the oversampling factor.

In one or more embodiments, the non-uniqueness of BC is solved by using a CRC check as a discriminating factor to decide whether rounding shall take place up or down (e.g. "ceiling" or "floor").

In fact, BC can be used to produce strobe signals (see BS in FIG. 9B as discussed in the following) used to sample the bits received: an erroneous value for BC leads to an erroneous decoding of received frames and to an ensuing failure of the CRC check.

Once a correct value for BC is identified (which may be seen as corresponding to the first measurement at 300 in FIG. 7), the slope of the ramp SC is updated (see SC in FIG. 5B by way of reference) so that the subsequent error value (that is $TE_B$) will be reduced (to less than ±5%, for instance).

Then the loop filter (see 2002, 2004 in FIG. 6, for instance) may produce a slope correction signal SC which is supplied to the timer circuit 2000, by simply rounding BC to the nearest integer.

Correcting the slope of a periodic signal amounts to varying its frequency, so that an error on the period can be converted into a frequency error FE (see FIG. 8):

$$F = \frac{1}{T} = \frac{1}{T^{typ} \times (1+\varepsilon)} \cong \frac{1}{T^{typ}} \times (1 \mp \varepsilon + \varepsilon^2)$$

As exemplified in FIG. 8 this may involve providing: a subtraction node 416; a digital signal converter 418 from s17/16 to s4/6; and a 4-bit multiplier 420.

Using a converter such as 418 facilitates using a multiplier having (only) 4 bits which results in an appreciable area saving in comparison to a multiplier having 16-bit (that is the original signal size). It is noted that the information loss due to conversion, is negligible insofar as the error signal exhibits reduced dynamics (+/−0.1, for instance).

Figure 9A:
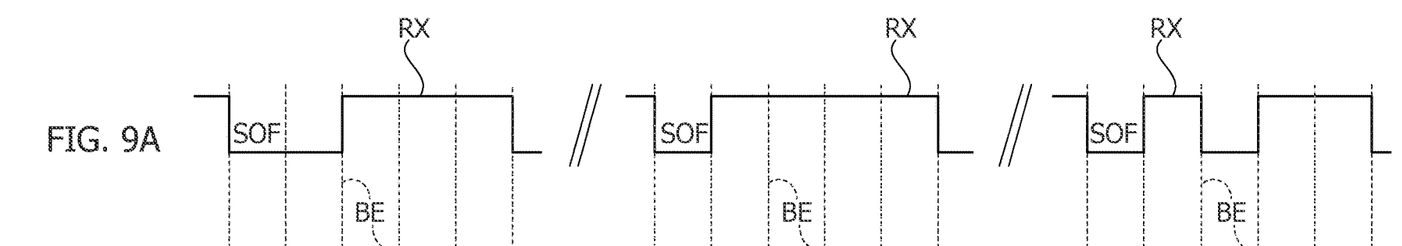
Figure 9B:
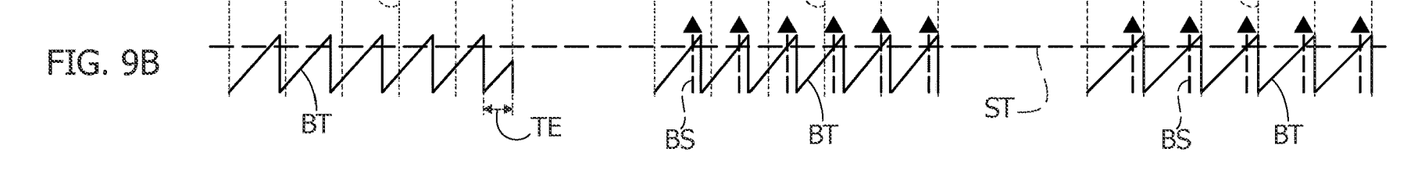

FIGS. 9A and 9B represent superposed diagrams sharing a common time scale (abscissa) wherein possible time behaviors/positions are shown for: the input signal RX having bit-edges at BE; the bit-signal BT from the timer circuit 2000; the strobe threshold ST applied by the bit-strobe generator circuit 2008; and the bit-strobe signal BS comprising pulses generated as result of the bit-signal BT (a sawtooth signal, as exemplified) reaching the strobe threshold ST.

The leftmost portions of FIGS. 9A and 9B are exemplary of a total error TE with reference to a "first" falling edge indicative the start of frame (SOF) condition.

This may correspond, for instance, to the first measured time discussed previously in connection with step 300 in FIG. 7 and a measured time corresponding to 5.5 (this is a purely exemplary value).

This is exemplary of a frame (including five bits having respective bit-edges BE shown in dashed lines) found to correspond to five periods and half (namely 5.5 periods) of the sawtooth signal from the timer circuit 2000.

The central portions of FIGS. 9A and 9B are exemplary of a (first) decoding step at 302 in FIG. 7 performed using a first value (floor=0, for instance) which results in six bit-strobe pulses BS, that is a bit-count equal to six and a corresponding negative outcome of the check at a step 304 of FIG. 7.

For simplicity, FIGS. 9A and 9B show just the initial portion of the frames. Since the decoder is evaluating a bit-stream different from the real one (e.g. "0111110 . . . " instead of "011110 . . . ") the "internal" CRC value will be different from the one of the bit-stream and so the CRC check will fail (outcome N of step 304 in FIG. 7—(CRC_OK=0).

Conversely, the rightmost portions of FIGS. 9A and 9B are exemplary of a (further) decoding performed after slope correction as exemplified by block 308 in FIG. 7. This time the decoder will be evaluating a bit-stream corresponding to the real one and the "internal" CRC value will be the same as the one of the bit-stream and so the CRC check will succeed (outcome Y of step 304 in FIG. 7—(CRC_OK=1). A lock condition will thus be affirmed as exemplified by block 306 in FIG. 7, with the bit-count signal subsequently evaluated just by rounding the timer signal (circuit 412).

A method as exemplified herein may comprise:

receiving (for instance, 300, 2008) at a receiver (for instance, 101, 102, . . . , 10N) an input signal (for instance, RX) arranged in frames, the frames including at least one field (for instance, CRCF) including a certain number of bits having bit edges (for instance, BE);

producing (for instance, 302, 2000) at said receiver a timing signal (for instance, BT) including waveforms having a duration adjustable (for instance, SC, 410) at one of a first duration value (for instance, 406) and a second duration value (for instance, 408);

performing a check (for instance, 304, 2006) as to the occurrence, over the duration of said certain number of bits having bit edges in said bit frames in said received input signal, of a number of waveforms of said timing signal having said duration adjusted to one of said first duration value and said second duration value which corresponds to said number of bits having bit edges;

producing a check signal (for instance, CRC) having a first (pass) value (for instance, Y) or a second (fail) value (for instance, N) as a function of whether said check is passed or failed;

as a result of said check signal having said first value, maintaining (for instance, 306) the duration of the waveforms in said timing signal adjusted to said one of said first duration value and said second duration value; and as a result of said check signal having said second value, re-adjusting (for instance, 308) the duration of the waveforms in said timing signal to the other of said first duration value and said second duration value.

In a method as exemplified herein: said timing signal may comprise a sawtooth signal including sawtooth waveforms with slope values adjustable at one of a first slope value and a second slope value. The method may further comprise:

as a result of said check signal having said first value, maintaining said slope of the sawtooth waveforms adjusted to said one of said first slope value and said second slope value; and as a result of said check signal having said second value, re-adjusting said slope of the sawtooth waveforms to the other of said first slope value and said second slope value.

A method as exemplified herein may comprise, as a result of said check signal having said first value, rounding (for instance, 412) the number of waveforms (for instance, BC) of said timing signal occurring over the duration of said bit frames in said received input signal to the nearest integer.

A method as exemplified herein may comprise:

producing (for instance, 402) a timing error signal (for instance, TE) indicative of the time offset of said timing signal with respect to the received input signal; and as a result of said check signal having said first value, producing (for instance, 2000) a strobe signal (for instance, BS) for sampling said input signal, wherein the frequency of said strobe signal is varied as a function (see, for instance, 404, 406, 408, 410, 412, 414, 416, 418, 420) of said timing error signal targeting (that is, having as a target) synchronizing said strobe signal with the bit edges in said input signal.

In a method as exemplified herein, producing (2000) said strobe signal may comprise:

generating (for instance, 406, 408, 410, 412, 414) a count value (for instance, BC) indicative of the number of waveforms of said timing signal occurring over the duration of said bit frames in said received input signal;

dividing (for instance, 404) said timing error signal by said count value to produce a per-bit timing error signal; and varying the frequency of said strobe signal as a function of said per-bit timing error signal targeting synchronizing said strobe signal with the bit edges in said input signal.

A method as exemplified herein may comprise converting (for instance, 416, 418, 420) said per-bit timing error signal to a frequency error signal (for instance, FE), wherein the frequency of said strobe signal is varied as a function of said frequency error signal.

In a method as exemplified herein, converting said per-bit timing error signal to a frequency error signal may comprise reducing the bit resolution (for instance, from s17/16 to S4/4) of the result of said dividing said timing error signal by said count value.

A method as exemplified herein may comprise, as a result of said check failing with said check signal having said second value over a certain number of said frames, declaring an error state (for instance, 310).

In a method as exemplified herein, said at least one field (for instance, CRCF) includes a set of bits comprised between two subsequent homologous bit edges in said input signal.

In a method as exemplified herein, said two subsequent homologous bit edges in said input signal may comprise two subsequent falling edges in said input signal having no falling edges therebetween.

In a method as exemplified herein:

said input signal may comprise a cyclic redundancy check sequence (CRC) in said at least one field (for instance, CRCF) including the certain number of bits having bit edges; and said check as to the occurrence, over the duration of said number of bits having bit edges in said bit frames in said received input signal, of said number of waveforms of said timing signal may comprise a cyclic redundancy check as a function of said cyclic redundancy check sequence (CRC).

A circuit (for instance, CDR) configured to implement a method as exemplified herein may comprise:

receiver circuitry (for instance, 2008) configured to receive said input signal arranged in frames including at least one field including a certain number of bits having bit edges;

timer circuitry (for instance, 2000, 2002, 2004) configured to produce said timing signal including waveforms having a duration adjustable at one of a first duration value and a second duration value;

check circuitry (for instance, 2006) configured to perform said check as to the occurrence, over the duration of said number of bits having bit edges in said bit frames in said received input signal, of a number of waveforms of said timing signal having said duration adjusted to one of said first duration value and said second duration value which corresponds to said number of bits having bit edges (BE) and producing said check signal having a first value or a second value as a function of whether said check is passed or failed; and wherein said timer circuitry is configured to maintain the duration of the waveforms in said timing signal adjusted to said one of said first duration value and said second duration value or to re-adjust the duration of the waveforms in said timing signal to the other of said first duration value and said second duration value as a result of said check signal having said first value or said second value, respectively.

A system (for instance, 100) as exemplified herein may comprise a network of devices (for instance, 101, 102, . . . , 10N) coupled via a bus (for instance, CANH, CANL) and configured to exchange over said bus communication signals arranged in frames, the frames including at least one field including a certain number of bits having bit edges, wherein the devices in said network may comprise respective circuits (for instance, CDR) configured to receive said communication signals arranged in frames and produce respective timing signals frequency-locked to said communication signals exchanged over said bus.

In a system as exemplified herein, said bus may comprise a CAN bus.

The claims are an integral part of the technical teaching provided herein in respect of illustrative embodiments.

Without prejudice to the underlying principles, the details and embodiments may vary, even significantly, with respect to what has been described by way of example only without departing from the extent of protection. The extent of protection is determined by the annexed claims.

The invention claimed is:

1. A method, comprising:

receiving an input signal arranged in frames;

producing a timing signal including a plurality of waveforms, wherein each waveform of said plurality of waveforms has a duration adjustable to one of a first duration value and a second duration value;

sampling said input signal in response to the timing signal to extract signal data and check data from said frames;

calculating from said extracted signal data a calculated check data;

performing a check as to determine whether said calculated check data matches said extracted check data;

producing a check signal having one of a first value or a second value as a function of whether said check is passed or failed, respectively;

maintaining the duration of the waveforms in said timing signal adjusted to said one of said first duration value and said second duration value if said check signal has said first value; and re-adjusting the duration of the waveforms in said timing signal to the other of said first duration value and said second duration value if said check signal has said second value.

2. The method of claim 1, wherein:

said timing signal comprises a sawtooth signal and each waveform is a sawtooth waveform having a slope value adjustable at a first slope value for setting said first duration value and a second slope value for setting said second duration value; and wherein maintaining the duration comprises maintaining said slope value of the sawtooth waveform at one of said first slope value and said second slope value; and wherein re-adjusting the duration comprises re-adjusting said slope value of the sawtooth waveform to the other of said first slope value and said second slope value.

3. The method of claim 1, comprising:

producing a timing error signal indicative of a time offset of said timing signal with respect to the received input signal;

producing a strobe signal from the timing signal, wherein the strobe signal is used for sampling said received input signal; and varying a frequency of said strobe signal as a function of said timing error signal targeting synchronizing said strobe signal with bit edges in said received input signal.

4. The method of claim 3, further comprising:
generating a count value indicative of the number of waveforms of said timing signal occurring over a duration of said frames in said received input signal; and
dividing said timing error signal by said count value to produce a per-bit timing error signal; and
wherein varying comprises varying the frequency of said strobe signal as a function of said per-bit timing error signal.

5. The method of claim 4, wherein generating the count value comprises to a nearest integer number.

6. The method of claim 4, further comprising converting said per-bit timing error signal to a frequency error signal, wherein a frequency of said strobe signal is varied as a function of said frequency error signal.

7. The method of claim 6, wherein converting comprises reducing a bit resolution of the per-bit timing error signal.

8. The method of claim 1, further comprising declaring an error state if said check signal has said second value over a certain number of said frames.

9. The method of claim 1, wherein said extracted check data is from a cyclical redundancy check field.

10. The method of claim 1, wherein each frame includes at least one field including a plurality of bits, further comprising:
determining a duration between two homologous bit edges in said at least one field;
wherein said two homologous bit edges comprise two falling edges having no falling edges therebetween; and
setting said one of the first duration value and the second duration value as a function of the determined duration.

11. The method of claim 1, wherein:
said extracted check data comprises a cyclic redundancy check sequence; and
performing the check comprises performing a cyclic redundancy check as a function of said cyclic redundancy check sequence.

12. A circuit, comprising:
receiver circuitry configured to receive an input signal arranged in frames;
timer circuitry configured to produce a timing signal including a plurality of waveforms, wherein each waveform of said plurality of waveforms has a duration adjustable to one of a first duration value and a second duration value;
a strobe circuit configured to sample said input signal in response to the timing signal to extract signal data and check data from said frames;
check circuitry configured to:
calculate check data from said extracted signal data;
perform a check to determine whether calculated check data matches said extracted check data; and
produce a check signal having one of a first value or a second value as a function of whether said check is passed or failed, respectively; and
wherein said timer circuitry is further configured to:
maintain the duration of the waveforms in said timing signal adjusted to said one of said first duration value and said second duration value if said check signal has said first value; and
re-adjust the duration of the waveforms in said timing signal to the other of said first duration value and said second duration value if said check signal has said second value.

13. The circuit of claim 12, wherein:
said timing signal comprises a sawtooth signal and each waveform is a sawtooth waveform having a slope value adjustable at a first slope value for setting said first duration value and a second slope value for setting said second duration value; and
wherein the timer circuitry is further configured to:
maintain said slope value of the sawtooth waveform at one of said first slope value and said second slope value; and
re-adjust said slope of the sawtooth waveform to the other of said first slope value and said second slope value.

14. The circuit of claim 12, wherein the timer circuitry is further configured to:
produce a timing error signal indicative of a time offset of said timing signal with respect to the received input signal;
produce a strobe signal from the timing signal, wherein the strobe signal is used for sampling said received input signal; and
vary a frequency of said strobe signal as a function of said timing error signal targeting synchronizing said strobe signal with bit edges in said received input signal.

15. The circuit of any of claim 14, wherein said strobe signal is produced by:
generating a count value indicative of the number of waveforms of said timing signal occurring over a duration of said frames in said received input signal; and
dividing said timing error signal by said count value to produce a per-bit timing error signal; and
wherein varying comprises varying the frequency of said strobe signal as a function of said per-bit timing error signal.

16. The circuit of claim 15, wherein said per-bit timing error signal is converted to a frequency error signal, and a frequency of said strobe signal is varied as a function of said frequency error signal.

17. The circuit of claim 16, further comprising a bit resolution converting circuit configured to reduce a bit resolution of the per-bit timing error signal.

18. The circuit of claim 12, wherein said extracted check data comprises a cyclical redundancy check field.

19. The circuit of claim 12, wherein each frame includes at least one field including a plurality of bits, and wherein said receiver circuit is configured to:
determine a duration between two homologous bit edges in said at least one field;
wherein said two homologous bit edges in said received input signal comprise two falling edges in said received input signal having no falling edges therebetween; and
set said one of the first duration value and the second duration value as a function of the determined duration.

20. The circuit of claim 12, wherein said extracted check data comprises a cyclic redundancy check sequence, and said check circuitry is configured to perform a cyclic redundancy check as a function of said cyclic redundancy check sequence.

21. A system, comprising:
a network of devices coupled via a bus and configured to exchange over said bus communication signals arranged in frames, wherein each frame includes at least one field including a certain number of bits between two homologous bit edges;

wherein each device in said network of devices comprises a circuit according to claim 12; and wherein the circuits are configured to receive said communication signals arranged in frames and produce respective timing signals frequency-locked to said communication signals exchanged over said bus.

22. The system of claim 21, wherein said bus comprises a Controller Area Network (CAN) bus.

* * * * *